Nov. 18, 1969  I. HOCHHAUSER  3,479,419
PROCESS AND APPARATUS FOR CURING MATERIAL BY INDUCTION HEATING
Filed May 3, 1965
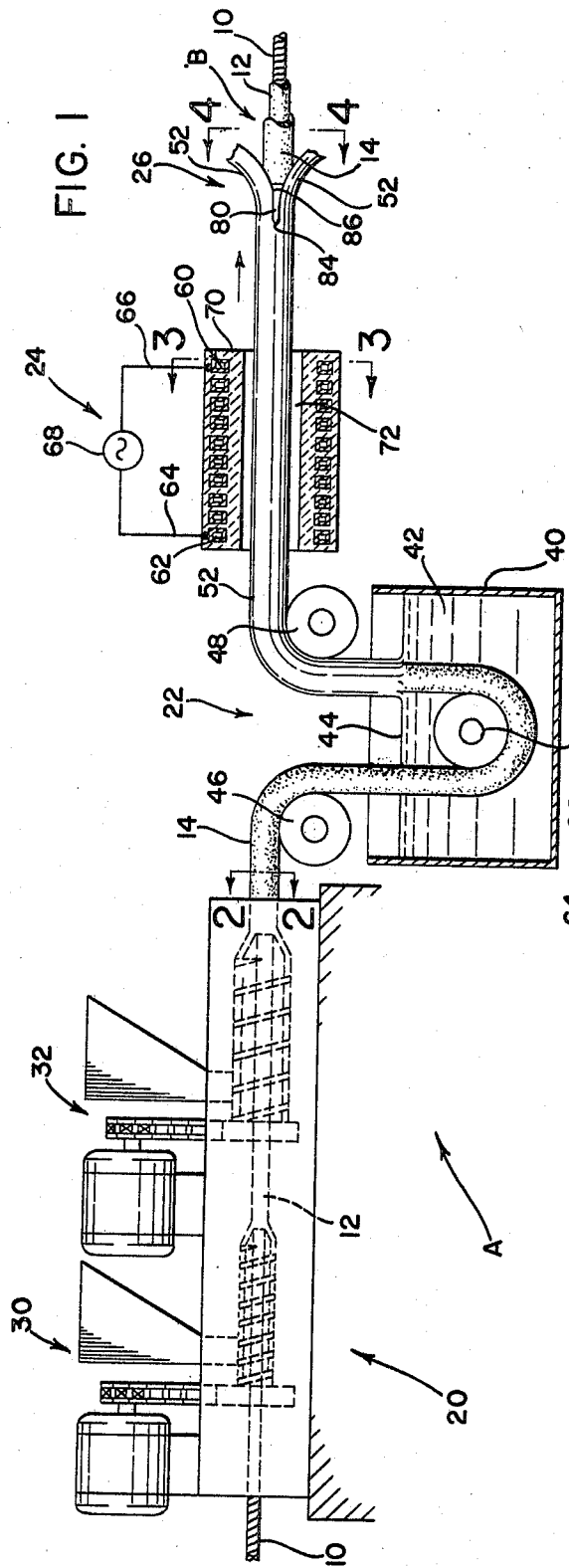
INVENTOR.
IRVING HOCHHAUSER
BY Tilberry & Body
ATTORNEYS United States Patent Office 3,479,419
Patented Nov. 18, 1969

3,479,419
PROCESS AND APPARATUS FOR CURING
MATERIAL BY INDUCTION HEATING
Irving Hochhauser, 158 Diamond Ave.,
East Meadow, N.Y. 11554
Filed May 3, 1965, Ser. No. 535,255
(Filed under Rule 47(b) and 35 U.S.C. 118)
Int. Cl. B29h 5/01
U.S. Cl. 264—25                    5 Claims

ABSTRACT OF THE DISCLOSURE

Method and apparatus for vulcanizing the rubber covering on the outer surface of a cable-like element wherein a lead-based alloy is coated over the covering and is inductively heated while the element is moving through an induction heating coil.

---

This invention pertains to the art of induction heating and more particularly to curing materials by induction heating.

The invention is particularly applicable to curing or vulcanizing the outer rubber layer on an electrical conductor and it will be described with particular reference thereto; however, it will be appreciated that the invention has much broader applications and may be used for curing many different heat curable materials utilized in various products.

The terms "cable" and "conductor" are used herein to define the element onto which a curable material is coated; however, it will be appreciated that these terms also include elongated, cable-like elements in general.

In producing rubber coated electrical conductors, the rubber coating is extruded over the conductor in an uncured condition. Thereafter, the uncured rubber covering is vulcanized so that it retains its shape and has sufficient physical properties. In the past, an outer coating of lead was placed over the unvulcanized rubber covering. This lead coating held the covering in the desired shape before and during the vulcanizing operation. Thereafter, the lead coated conductor was coiled and placed within a steam auto-clave for vulcanizing the rubber within the lead. After vulcanizing, the lead coating was then stripped from the conductor. If the rubber coating were vulcanized in the auto-clave without the lead coating, the rubber would sag and otherwise deform before it was vulcanized into a final shape. Consequently, the lead covering was required to insure that the rubber coating remained in the desired shape during the vulcanizing operation.

This commonly used method for producing rubber insulated electrical conductors had various disadvantages. For instance, after the conductor was coated with lead, it had to be cut into lengths and coiled before being placed into the auto-clave. Thereafter, the conductor had to be uncoiled so that the lead would be stripped from the vulcanized rubber. This coiling and uncoiling of the conductor during the processing substantially increased the labor and capital expense surrounding the production of rubber insulated electrical conductors.

These and other disadvantages of the prior method for producing rubber insulating, electrical conductors is overcome by the present invention which is directed toward a method and apparatus for curing or vulcanizing the curable material on an electrical conductor, or a similar cable-like item, without requiring that the conductor be cut into lengths for the curing operation. In other words, the present invention is directed toward an apparatus and method of the general type described above wherein the rubber covering on the electrical conductor can be vulcanized while having an undeterminate length.

In accordance with the present invention, there is provided a method of vulcanizing the rubber covering on the outer surface of a cable-like element, the method comprises applying a layer of low melting point metal onto the rubber covering; and, inductively heating the metal layer to vulcanize the covering by heat conducted from the heated layer to the covering.

In accordance with another aspect of the present invention, there is provided an apparatus for vulcanizing the rubber covering on the outer surface of a cable-like element, the apparatus comprises a means for applying a layer of low melting point metal on the rubber covering; an induction heating coil having an internal passage generally matching the outer dimensions of the metal covered, cable-like element; a high frequency power source for energizing the coil; and, means for moving the metal covered cable-like element through the passage of the heating coil whereby the coil heats the metal layer to cause vulcanization of the rubber covering.

The primary object of the present invention is the provision of a method and apparatus for curing heat curable covering on a cable-like element which method and apparatus are easily adapted for use with existing equipment, are economical in operation and are adapted for continuous operation.

Another object of the present invention is the provision of a method and apparatus for curing a heat curable covering on a cable-like element which method and apparatus involve the application of an easily removable metal onto the covering and inductively heating the applied metal to cure the covering.

These and other objects and advantages will become apparent from the following description used to illustrate the preferred embodiment of the present invention as read in connection with the accompanying drawing in which:

FIGURE 1 is a schematic side elevational view illustrating the preferred embodiment of the present invention;

FIGURE 2 is an enlarged, cross-sectional view taken generally along line 2—2 of FIGURE 1;

FIGURE 3 is an enlarged, cross-sectional view taken generally along line 3—3 of FIGURE 1; and FIGURE 4 is an enlarged, cross-sectional view taken generally along line 4—4 of FIGURE 1.

Referring now to the drawing wherein the showings are for the purpose of illustrating a preferred embodiment of the invention only and not for the purpose of limiting same, FIGURE 1 shows an apparatus A for producing an electrical conductor B having a vulcanized outer rubber covering. In accordance with the illustrated embodiment of the present invention, the conductor B includes an inner cable-like element 10 formed from a plurality of strands of electrically conductive materials, such as aluminum or copper, an inner insulation layer 12 of a non-conductive material, such as plastic, and an outer rubber covering 14. Apparatus A comprises an extruding stand 20 for successively extruding layer 12 and covering 14 onto element 10, a dipping bath 22 for depositing lead, or a similar low melting point metal, onto the outer surface of covering 14, a heating station 24 for inductively heating the lead surrounding covering 14 and a stripping device 26 for removing the lead from the conductor B after the covering 14 has been vulcanized. To better appreciate the present invention, each of these separate components of apparatus A will be hereinafter described in detail.

Referring now to the extruding stand 20, an extruder head 30, of common construction, deposits an insulation material 12 onto the element 10. Thereafter, an extruder head 32 deposits an uncured covering of rubber 14 onto the insulation layer 12. The conductor B leaves the extruding head 20 with the uncured rubber covering 14 being somewhat set into a final desired shape. If vulcanizing heat were now applied to covering 14, the covering 14 would become soft and would flow from the layer 12; therefore, provision must be made for holding the uncured covering 14 in the general shape imparted thereto by extruder head 32.

To assure that the covering 14 maintains its shape during subsequent vulcanization, the conductor B is passed through the dipping bath 22. This bath includes a tank 40 filled with a low melting point metal 42. This metal must be easily removable from the covering 14 after the covering is vulcanized and the metal must have sufficient strength to solidify and hold the covering in the proper shape during vulcanization. It has been found that lead or a lead-base alloy is well adapted for this use; therefore, in accordance with the preferred embodiment of the present invention, lead or a lead-base alloy is melted and placed within tank 40 to a level 44, as shown in FIGURE 1. Above the tank 40 there are provided two guide rollers 46, 48 and within the tank there is provided a lower roller 50. The conductor B passes into and out of tank 40 by movement around the respective rollers, as shown in FIGURE 1. As the conductor B leaves the tank in a vertical direction, a thin layer 52 of the metal within tank 40 is maintained on the outer surface of covering 14. This layer 52 rapidly solidifies and holds the covering 14 in the desired shape during subsequent vulcanization. By leaving tank 40 in a vertical direction, the layer 52 is somewhat uniform in thickness around the conductor B. It is appreciated that other arrangements could be utilized for applying the supporting layer 52 onto the covering 14.

After the conductor B is coated with layer 52, it passes through the heating station 24 wherein the layer 52 is inductively heated to a temperature sufficient to cause vulcanization of the rubber forming covering 14. This temperature is generally within the range of 300° F.–620° F.

In accordance with the invention, heating station 24 includes an induction heating coil 60 with an internal coolant passage 62 to prevent overheating of the coil. Opposite ends of the coil terminate at leads 64, 66 which are connected across a source of high frequency current, schematically represented as generator 68. Although a variety of high frequency generators could be utilized for energizing coil 60, in practice the generator is a motor-generator set having an output frequency of 10 kilocycles and an output power having a sufficient level to raise the coated conductor to the vulcanizing temperature as it moves through coil 60. The coil 60 is encapsulated within insulation 70 to provide an internal passage 72 having internal dimensions slightly greater than the external dimensions of the conductor B. Since the metal forming the layer 52 is conductive, the flux field within the coil 60 creates voltage potential within the layer 52 as the conductor B moves through passage 72. These voltage potentials cause current flow within the layer 52 and the layer is heated by the I²R heating effect of the current flow. As the layer 52 is heated, heat energy is conducted from the metal layer inwardly to the covering 14, as schematically represented by the arrows in FIGURE 3. This heat energy vulcanizes, or otherwise cures, the covering 14 so that it permanently acquires the shape determined by the solidified shape of layer 52.

After the covering 14 has been cured into the desired shape, the lead layer 52 is no longer required; therefore, this layer is removed by stripping device 26. This device includes a pair of diametrically opposed blades 80, 82. Each blade has a cutting edge 84 and a spreader 86 so that the cutting edge cuts the layer 52 and the spreader forces the cut lead layer 52 outwardly from the covering 14. In a manner not shown, the removed layer 52 is cut and remelted for use in tank 40.

Although curing of the rubber coating on an electrical conductor is disclosed, it should be appreciated that the invention may be utilized for curing various shaped articles by covering the articles with a low melting point metal then inductively heating the metal. Other similar uses of the present invention could be easily devised after considering the above description.

The present invention has been described in connection with a certain structural embodiment; however, it is appreciated that various changes may be made in the structural embodiment without departing from the intended spirit and scope of the present invention as defined in the appended claims.

Having thus described my invention, I claim:

1. A method of vulcanizing the rubber covering on the outer surface of a cable-like element, said method comprising: applying a layer of low melting point metal on said rubber covering; and, passing said metal covered cable-like element through an energized, induction heating coil having an internal diameter generally matching the metal layer whereby said metal layer is heated to vulcanize said rubber covering.

2. A method of vulcanizing the rubber covering on the outer surface of a cable-like element, said method comprising: applying a layer of low melting point metal on said rubber covering; passing said metal covered cable-like element through an energized, induction heating coil having an internal diameter generally matching the metal layer whereby said metal layer is heated to vulcanize said rubber covering; and, thereafter, removing said metal layer from said vulcanized covering.

3. A method of vulcanizing the rubber covering on the outer surface of a cable-like element, the method comprising: applying a layer of lead-base metal on said rubber covering; passing said metal covered cable-like element through an energized, induction heating coil having an internal diameter generally matching the metal layer whereby said metal layer is heated to vulcanize said rubber covering; and, thereafter, removing said metal layer from said vulcanized covering.

4. A method of producing elongated elements of undetermined length, said method comprising: moving a cable-like element in a given path; applying a layer of heat curable material onto said cable-like element; applying a layer of low melting point metal onto said heat curable material; and, then, inductively heating said metal layer to cure said heat curable material by heat conducted from said heated metal layer to said curable material.

5. An apparatus for vulcanizing the rubber covering on the outer surface of a cable-like element, said apparatus comprising: a means for applying a layer of low melting point metal on said rubber covering; an induction heating coil having an internal passage generally matching said metal covered, cable-like element; a high frequency power source for energizing said coil; and, means for moving said metal covered, cable-like element through said passage of said heating coil whereby said coil heats said metal layer to cause vulcanization of said rubber covering.

References Cited

UNITED STATES PATENTS

| | | | |
|---|---|---|---|
| 1,736,444 | 11/1929 | Huestis | 264—236 XR |
| 1,876,745 | 9/1932 | Potter | 264—25 |
| 3,365,522 | 1/1968 | Inove | 264—25 |

PHILIP E. ANDERSON, Primary Examiner

U.S. Cl. X.R.

18—6; 264—174, 236, 347